(12) United States Patent
Johnson et al.

(10) Patent No.: US 7,448,124 B2
(45) Date of Patent: *Nov. 11, 2008

(54) APPARATUS FOR INSTALLING AN EDGE PIECE ON A BATTERY PLATE

(75) Inventors: David A. Johnson, Corvallis, OR (US); Peter E. Johnson, Corvallis, OR (US)

(73) Assignee: MiTek Holdings, Inc., Chesterfield, MO (US)

( * ) Notice: Subject to any disclaimer, the term of this patent is extended or adjusted under 35 U.S.C. 154(b) by 485 days.

This patent is subject to a terminal disclaimer.

(21) Appl. No.: 11/196,356

(22) Filed: Aug. 3, 2005

(65) Prior Publication Data

US 2005/0262979 A1 Dec. 1, 2005

Related U.S. Application Data

(60) Continuation of application No. 10/723,597, filed on Nov. 24, 2003, now Pat. No. 7,077,876, which is a division of application No. 09/671,464, filed on Sep. 27, 2000, now Pat. No. 6,685,753.

(51) Int. Cl.
*B23P 23/00* (2006.01)

(52) U.S. Cl. ............... 29/564.6; 29/33 R; 29/33 K; 29/623.1

(58) Field of Classification Search .............. 29/564.1, 29/564.6, 564.7, 564.8, 623.1, 623.2, 566.1, 29/566.2, 566.3, 730, 731, 739, 741, 837, 29/33 R, 33.2, 33.5, 33.52, 33 E, 33 K, 33 M, 29/33 Q, 33 S; 164/262, 70.1; 156/213, 156/227, 484; 53/296; 226/196.1

See application file for complete search history.

(56) References Cited

U.S. PATENT DOCUMENTS

| | | | |
|---|---|---|---|
| 3,623,540 A * | 11/1971 | Goodwin et al. | ........... 29/527.6 |
| 3,892,620 A | 7/1975 | Heussy | |
| 3,900,341 A | 8/1975 | Shoichiro et al. | |
| 4,026,000 A | 5/1977 | Anderson | |
| 4,080,727 A | 3/1978 | Stolle et al. | |
| 4,205,433 A * | 6/1980 | Araki et al. | ................. 29/564.6 |
| 4,209,882 A * | 7/1980 | Strickland et al. | ........... 29/564.6 |
| 4,314,403 A | 2/1982 | Sanekata | |

(Continued)

FOREIGN PATENT DOCUMENTS

| | | |
|---|---|---|
| EP | 0 381 128 A2 | 8/1990 |
| FR | 924317 | 8/1947 |
| FR | 2 688 738 | 9/1993 |

OTHER PUBLICATIONS

European Search Report for European App. No. EP 01 30 7411; dated Jan. 28, 2002; 3 pages.

*Primary Examiner*—Dana Ross
(74) *Attorney, Agent, or Firm*—Senniger Powers LLP

(57) ABSTRACT

An apparatus for placing an edge piece on a battery plate includes a feed mechanism which transports a strip of bendable plastic material. A bending mechanism forms this strip into an open top, U-shaped channel. A cutter cuts the channel into an edge piece having a length which is substantially equal to an edge of the battery plate which is to be covered. An in-feed conveyor transports a battery plate toward the edge piece, and a support mechanism supports the edge piece while the edge of the battery plate is inserted into it. The support mechanism then releases the edge piece so that it can travel out of the apparatus with the battery plate.

16 Claims, 7 Drawing Sheets

U.S. PATENT DOCUMENTS

| | | | |
|---|---|---|---|
| 4,407,063 A | | 10/1983 | Johnson |
| 4,418,464 A | * | 12/1983 | DiGiacomo et al. ........ 29/564.6 |
| 4,510,682 A | * | 4/1985 | Sabatino et al. ............ 29/564.6 |
| 5,616,434 A | * | 4/1997 | Redden et al. ............... 429/136 |
| 6,442,811 B1 | * | 9/2002 | Dawood et al. ................ 29/731 |
| 6,499,208 B2 | * | 12/2002 | Schwetz et al. ............ 29/564.6 |
| 6,638,382 B2 | * | 10/2003 | Satou .......................... 156/64 |
| 6,685,753 B1 | | 2/2004 | Johnson et al. |

\* cited by examiner

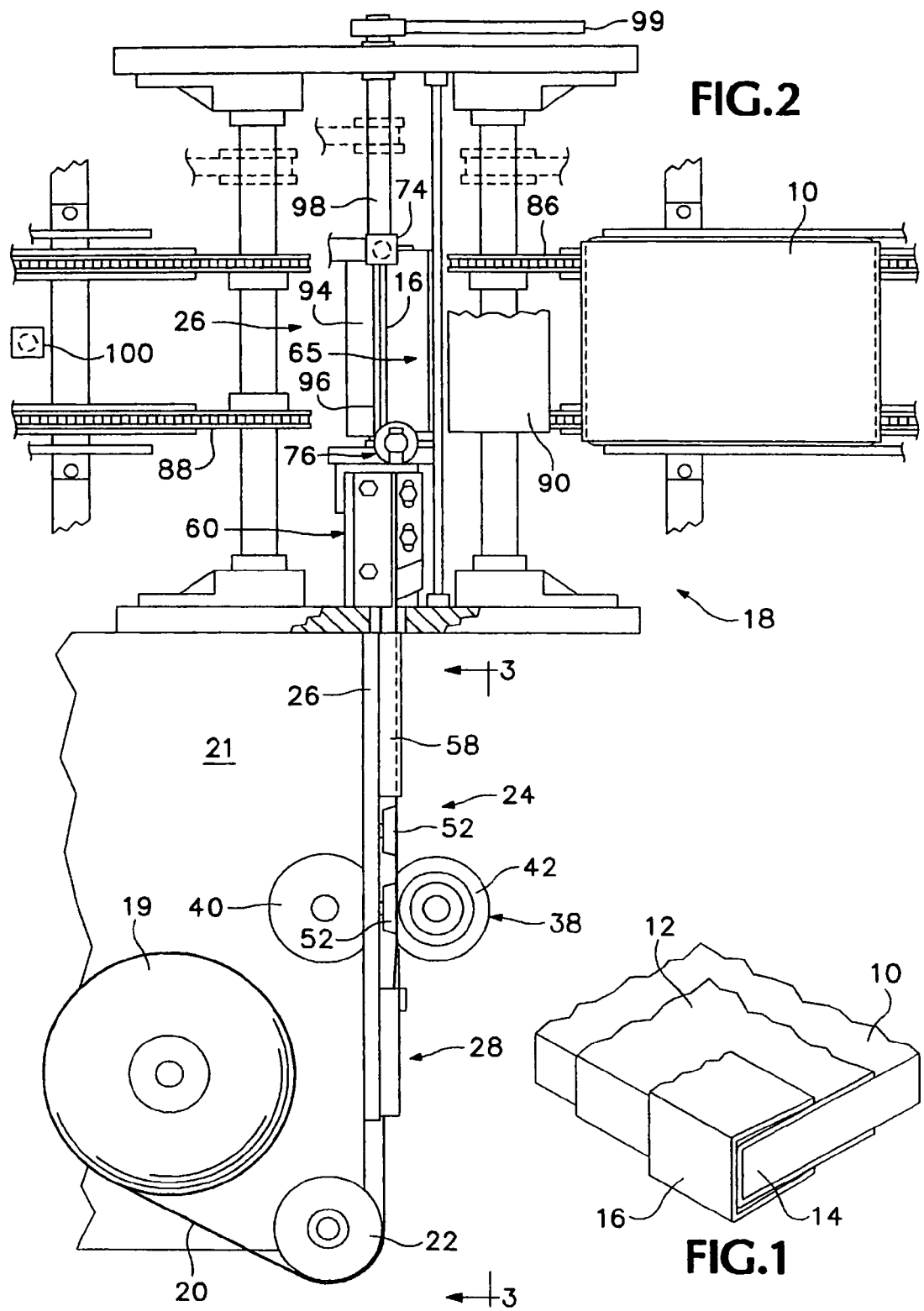

APPARATUS FOR INSTALLING AN EDGE PIECE ON A BATTERY PLATE

CROSS-REFERENCE TO RELATED APPLICATIONS

This is a continuation of U.S. application Ser. No. 10/723,597, filed Nov. 24, 2003, which is a division of U.S. application Ser. No. 09/671,464, filed Sep. 27, 2000 and patented as U.S. Pat. No. 6,685,753.

BACKGROUND OF THE INVENTION

This invention relates to a method and apparatus for placing edge pieces on battery plates.

Industrial battery plates are wrapped in a sheet of fiberglass mat. The edge of the battery plate that this mat is wrapped around is protected with an edge piece. In the past this edge piece was a pliable strip of plastic material which was manually wrapped around the edge of the battery plate and heat sealed to a plastic overwrap. This process is labor-intensive and quite costly.

In an attempt to simplify this process, pre-formed plastic boots were provided that fit tightly over the edges of the battery plates. While these boots lowered the cost, they still had to be manually installed. The size of any mass-formed plastic part will not be absolutely repeatable. If a boot was too small it would break when it was installed by automated equipment, and if it was too large it would not stay in place as a battery plate underwent further processing. Installing a boot is made even more difficult because the fiberglass mat does not provide a smooth surface to install the boot over. Each time a boot was not properly installed production was stopped. Thus, it was not possible to install these boots with automated equipment.

BRIEF DESCRIPTION OF SEVERAL VIEWS OF THE DRAWINGS

FIG. 1 is a fragmentary prospective view of a battery plate having the edge piece of the subject invention installed.

FIG. 2 is a fragmentary plan view, partially broken away to show hidden detail, of the apparatus of the subject invention.

DETAILED DESCRIPTION OF PREFERRED EMBODIMENT

Figure 3:
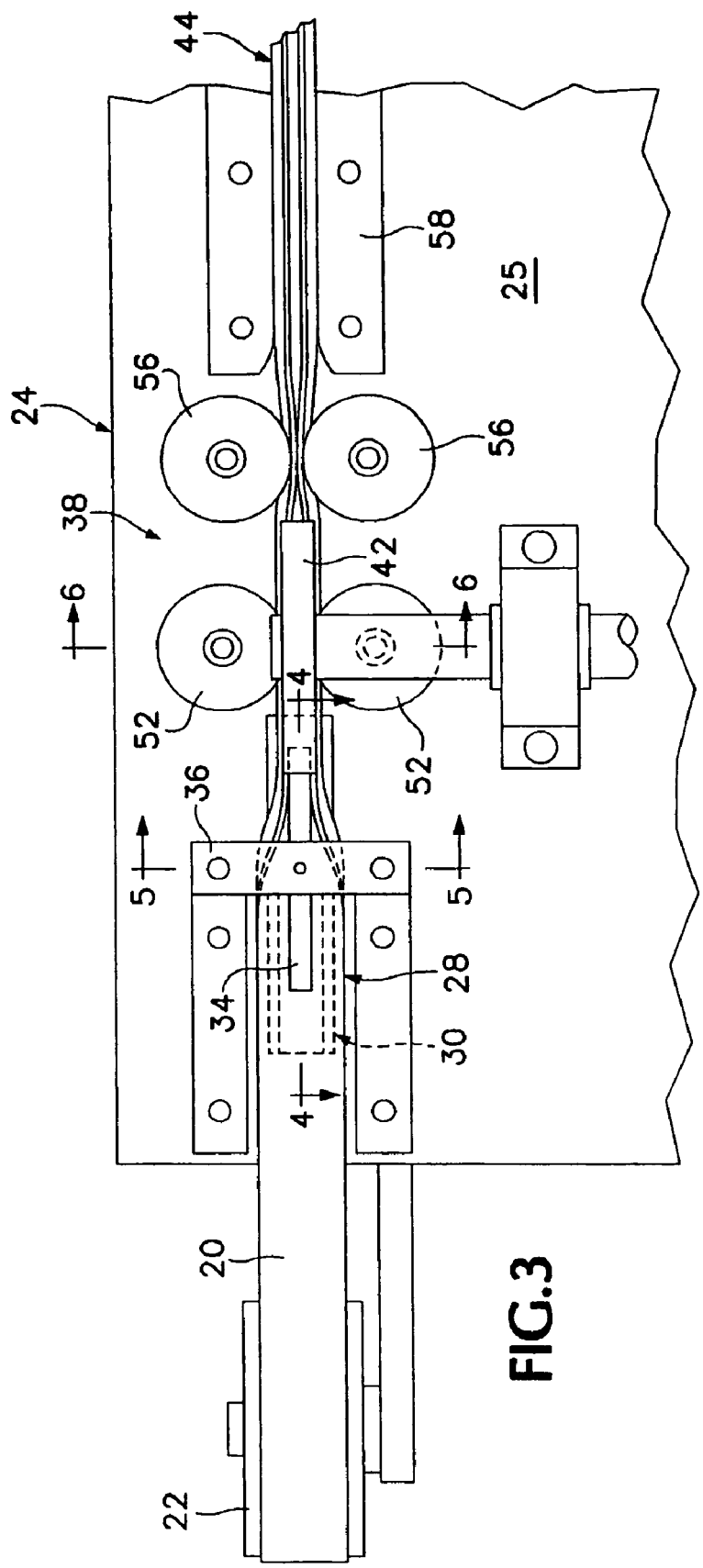
FIG. 3 is a cross-sectional view, at an enlarged scale, taken on the line 3-3 of FIG. 2.

Referring now to FIG. 1 of the drawings, battery plates 10 that are used in industrial batteries are covered with sheets of fiberglass mat 12. The most common mat material is sold under the name STRANMATT. The mat is wrapped around one edge 14 of the battery plate. This invention relates to a U-shaped edge piece 16 that is placed over this wrapped edge 14 to hold the mat in place on the battery plate.

An apparatus 18, FIG. 2, forms the edge pieces 16 and applies them to battery plates in a fully automated matter. A roll 19 containing a thin strip of bendable plastic material 20 is rotatably mounted on a horizontal table 21. The strip preferably is rigid PVC approximately 1 inch wide and 0.030 inch thick. The strip wraps around a guide roller 22 and passes through a bending mechanism 24 which bends it into a U-shaped channel. The U-shaped channel then passes into an assembly station 26 where it is cut into an edge piece 16 having a length equal to the edge of the battery plate. The leading edge 14 of a battery plate 10 is then inserted into it. The plate with the edge piece installed is then transported out of the apparatus and the cycle is repeated.

Figure 4:
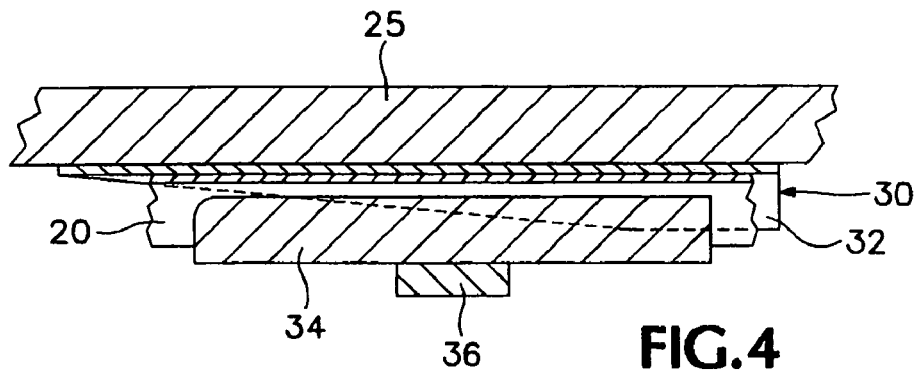
FIG. 4 is a cross-sectional view, at an enlarged scale, taken on the line 4-4 of FIG. 3.
Figure 5:
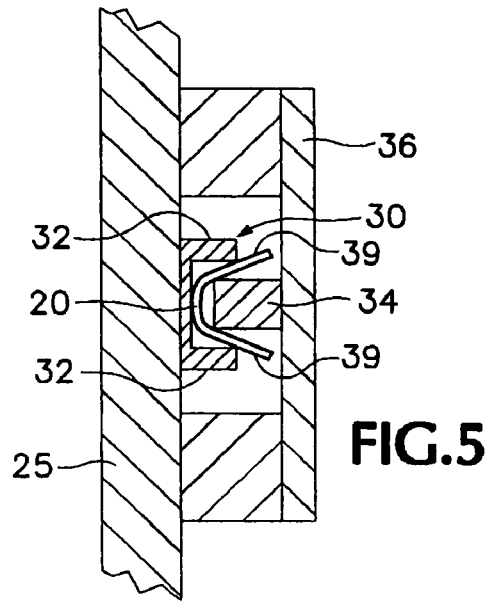
FIG. 5 is a cross-sectional view, at an enlarged scale, taken on the line 5-5 of FIG. 3.

Referring now to FIGS. 3-5, the bending mechanism 24 is mounted on a vertical plate 25 which is attached to the table 21. The bending mechanism includes a plow 28 which deflects the opposed margins of the strip inwardly toward one another to initiate the bending process. The plow includes a U-shaped trough 30 which is attached to the plate 25. The trough has tapered sides 32 which extend upwardly from the plate 25 at the inlet to the plow to a maximum height at the exit of the plow. A deflector 34, which is suspended from a bridge 36 which is mounted on the plate 25 and straddles the plow, projects into the trough. The corner of the leading edge of the deflector that faces towards the trough is rounded. The width of the deflector is sufficiently less than the width of the plow to permit the margins 37 of the strip 20 to have room to be deflected as the strip passes through the plow. In the preferred embodiment illustrated, the width of the deflector is approximately ⅔rds the width of the trough. The bottom of the deflector is separated from the bottom of the trough by an amount equal to the distance between the sides of the deflector and the sides of the trough. As the strip exits the plow, its margins 37 are deflected upwardly, as shown in FIG. 5.

Figure 6:
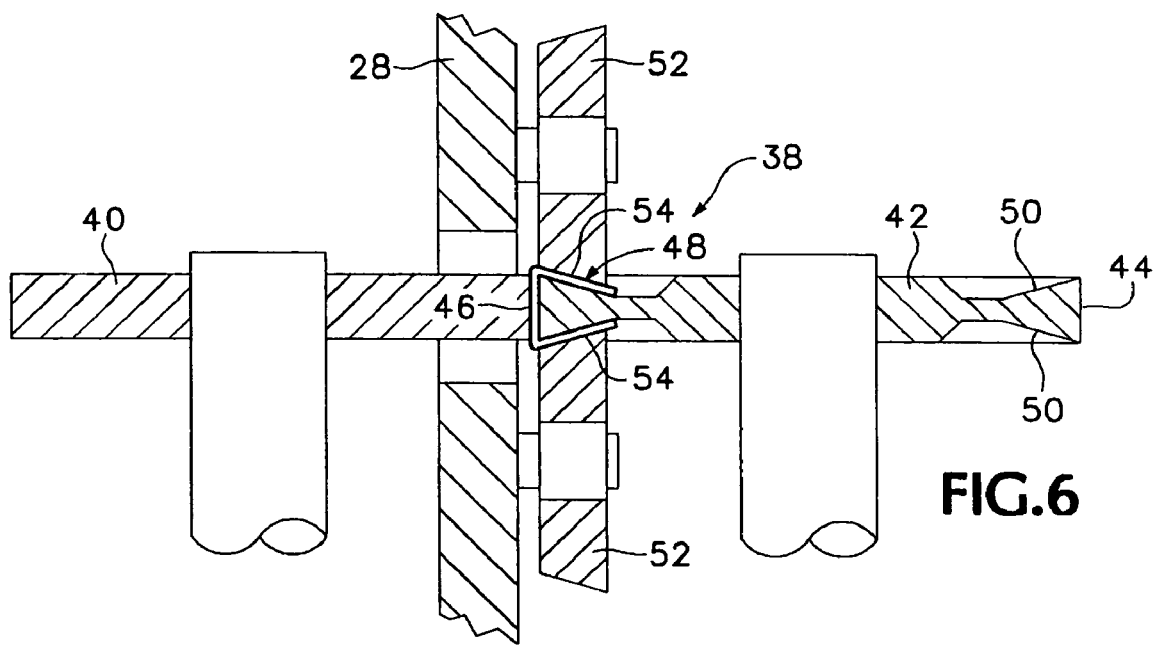
FIG. 6 is a cross-sectional view, at an enlarged scale, taken on the line 6-6 of FIG. 3.

Referring now to FIGS. 3 and 6, located downstream from the plow 28 is a series of bending rollers 38 which complete the bending of the strip 20 and which transport the strip through the apparatus. A rubber-coated pressure roller 40 engages the center portion of the back side of the strip. Opposite the pressure roller 40 is a forming roller 42. The forming roller 42 transports the roller through the apparatus. The forming roller has a squared-off end 44 which is spaced apart from the end of the drive roller by a distance which is approximately equal to the thickness of the strip. The end of the forming roller acts with the end of the pressure roller 40 to form the bottom element 46 of the U-shaped channel 48 that is being formed. Located on each side of the forming roller, immediately adjacent to its end 44 is an engagement face 50. The engagement faces 50 are angled inwardly toward one another as they extend away from the end of the forming roller.

Located outwardly of the engagement faces 50 of the forming roller 42 is a pair of pinch rollers 52. The ends of the pinch rollers are oriented at an angle which is the compliment of the angle of the engagement faces of the forming roller. The ends of the pinch rollers are separated from the engagement faces of the forming roller by a distance which is approximately equal to the thickness of the strip 20. The edges of the pinch rollers act with the engagement faces of the forming roller to form the sides 54 of the U-shaped channel 48. As can be seen in FIG. 6, the sides 54 are bent more than 90° with respect to the bottom element 46. However, the sides of the channel will recover somewhat as the channel leaves the forming and pinch rollers and it is desired that the sides be permanently bent inwardly at an angle so that they will grip the edge of the battery plate. As a result, the channel is passed through a second set of pinch rollers 56, FIG. 3, which are closer together than the pinch rollers 52 and do not have a forming roller between them. The forming roller 42 is rotated by a motor (not shown).

Figure 7:
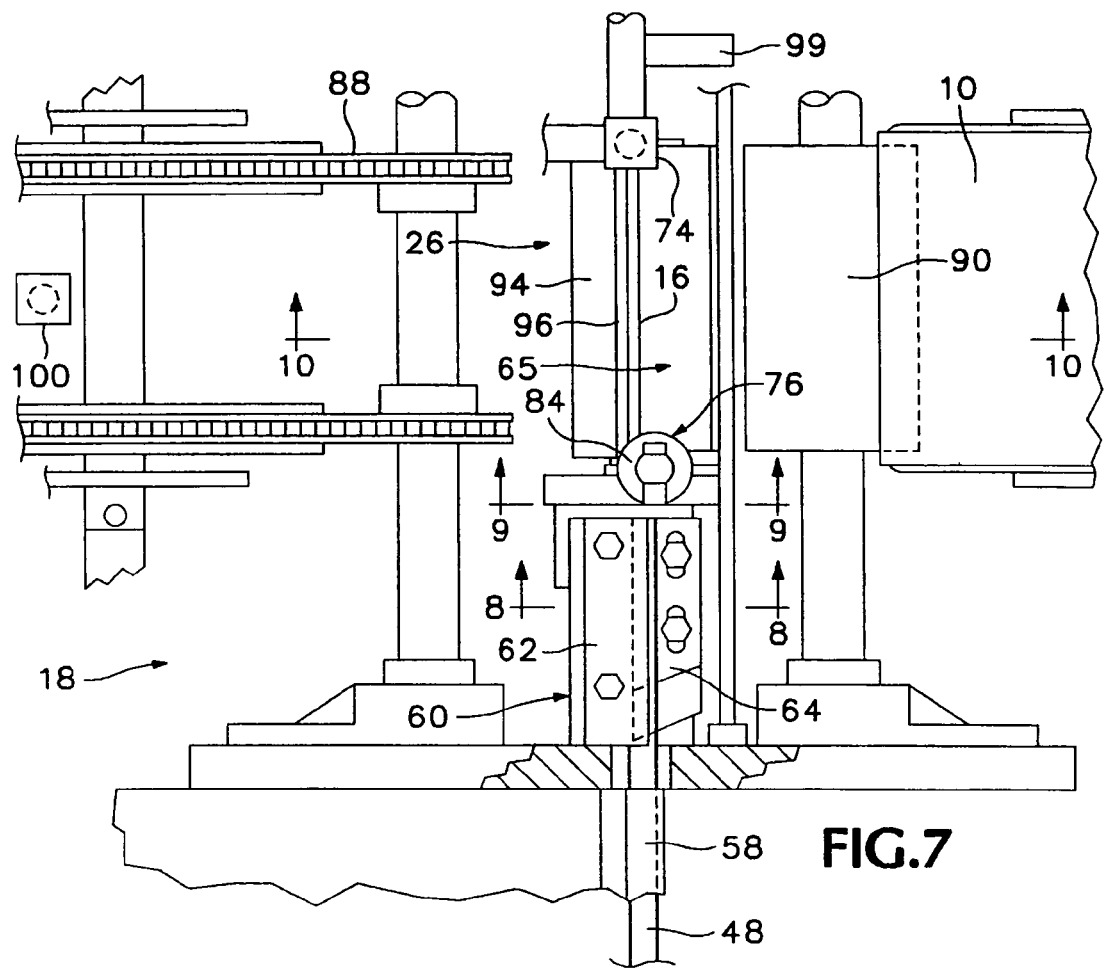
FIG. 7 is a fragmentary plan view of the apparatus of FIG. 2.
Figure 8:
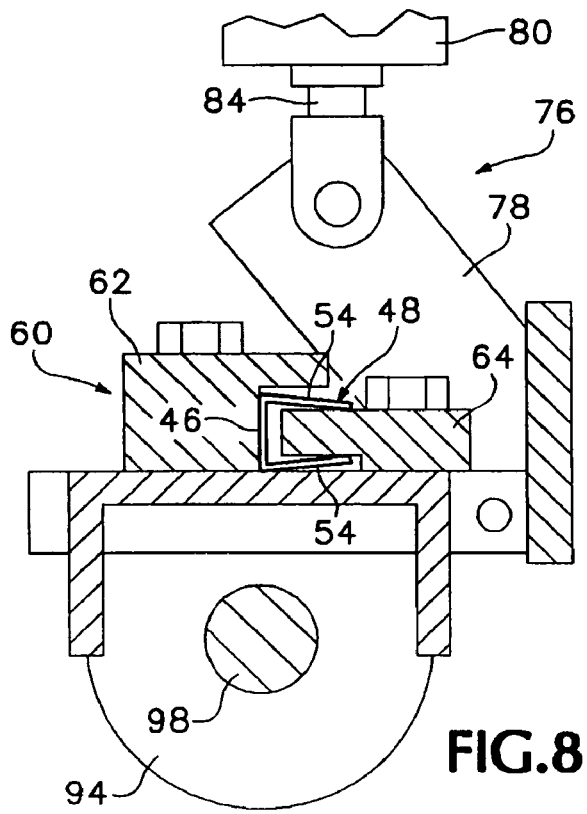
FIG. 8 is a sectional view, at an enlarged scale, taken on the line 8-8 of FIG. 7.
Figure 9:
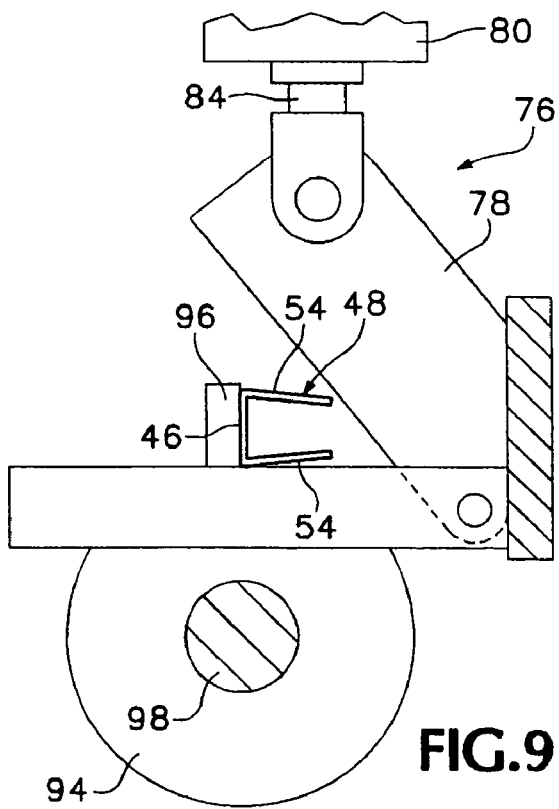
FIG. 9 is a cross-sectional view, at an enlarged scale, taken on the line 9-9 of FIG. 7.

As the channel 48 leaves the bending mechanism 24 it passes through a pair of side-by-side guide plates 58 and into a spreader 60, FIGS. 7 and 8. The spreader opens the channel 48 as it passes into the assembly station 26. The spreader 60 includes a guide 62 and a spreader bar 64. The spreader bar has a tapered leading edge so that the sides 54 of the channel 48 ride up on either side of the spreader bar.

Figure 10:
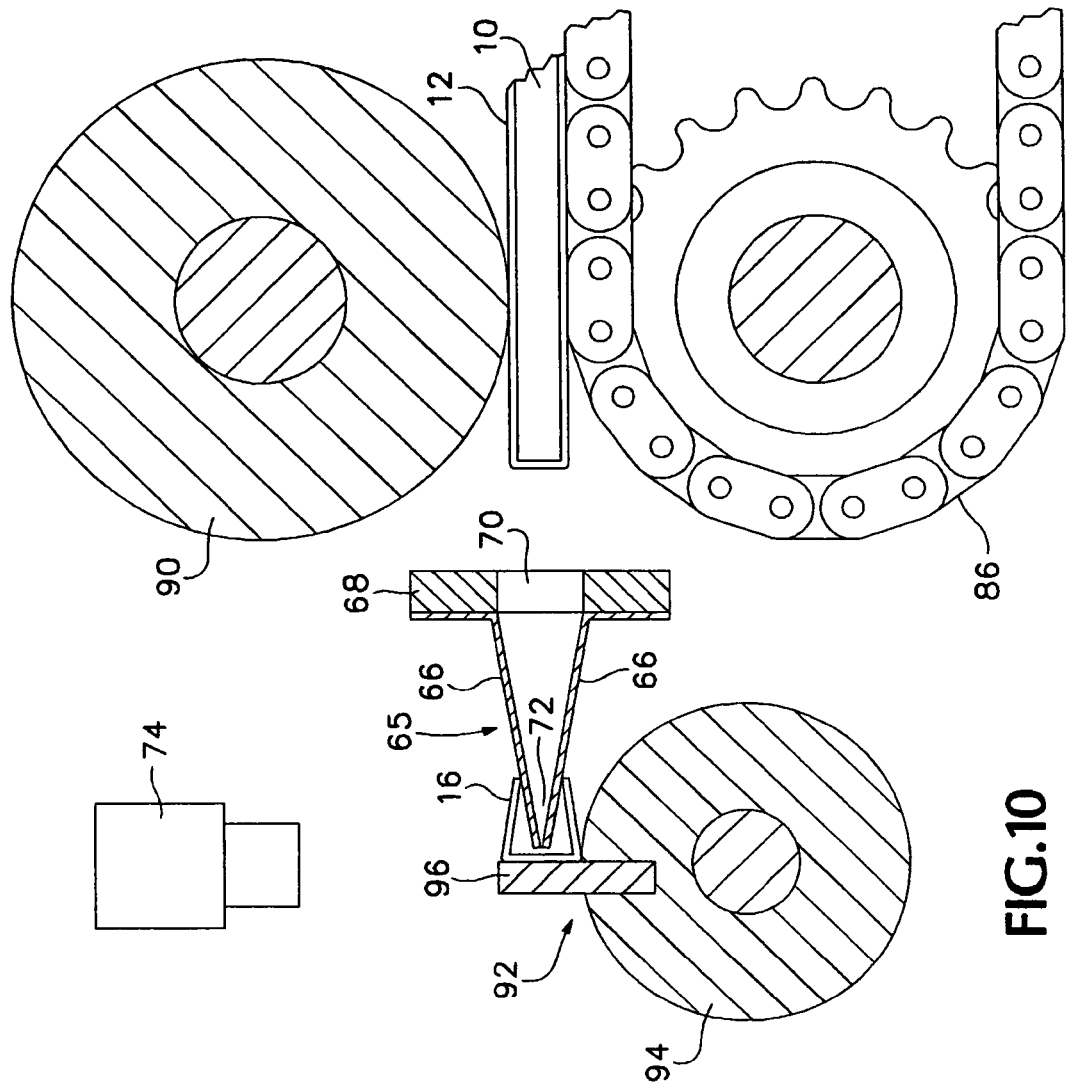
FIG. 10 is a cross-sectional view, at an enlarged scale, taken on the line 10-10 of FIG. 7.

Located in the assembly station is a funnel 65 which the spread-open channel 48 fits over. Referring now also to FIG. 10, the funnel includes top and bottom plates 66 which are attached to an elongate orifice plate 68 that extends across the assembly station. The orifice plate has an opening 70 which is large enough for a battery plate to freely pass through. The plates 66 are angled toward one another to create an outlet 72 over which the spread-open channel 48 fits.

Located at the far side of the assembly station is a sensor 74 which senses when the channel is fully in the assembly station. When the sensor senses that this has happened, the motor that drives the forming roller 42 is temporarily stopped. In addition, a knife 76, which is located at the inlet side of the assembly station, is activated to cut the channel to form an edge piece 16, having a length which is equal to the width of a battery plate. The knife 76 includes a blade 78 and a piston cylinder 80 which moves the blade between a raised position where it is out of the path of the channel and a lowered position where the knife cuts through the channel. The knife is pivotally attached at its bottom to the frame of the apparatus and its top to the rod 84 of the piston cylinder. This prevents the blade from being deflected as it cuts through the channel.

Intersecting the assembly station 26 is an in-feed conveyor 86 and an out-feed conveyor 88 which transport the battery plates 10. Located above the in-feed conveyor, immediately upstream of the assembly station, is a roller 90 which holds the battery plates down on the in-feed conveyor as they enter the assembly station. The in-feed and out-feed conveyors 86, 88 and the roller 90 are all driven by a motor (not shown).

Figure 11:
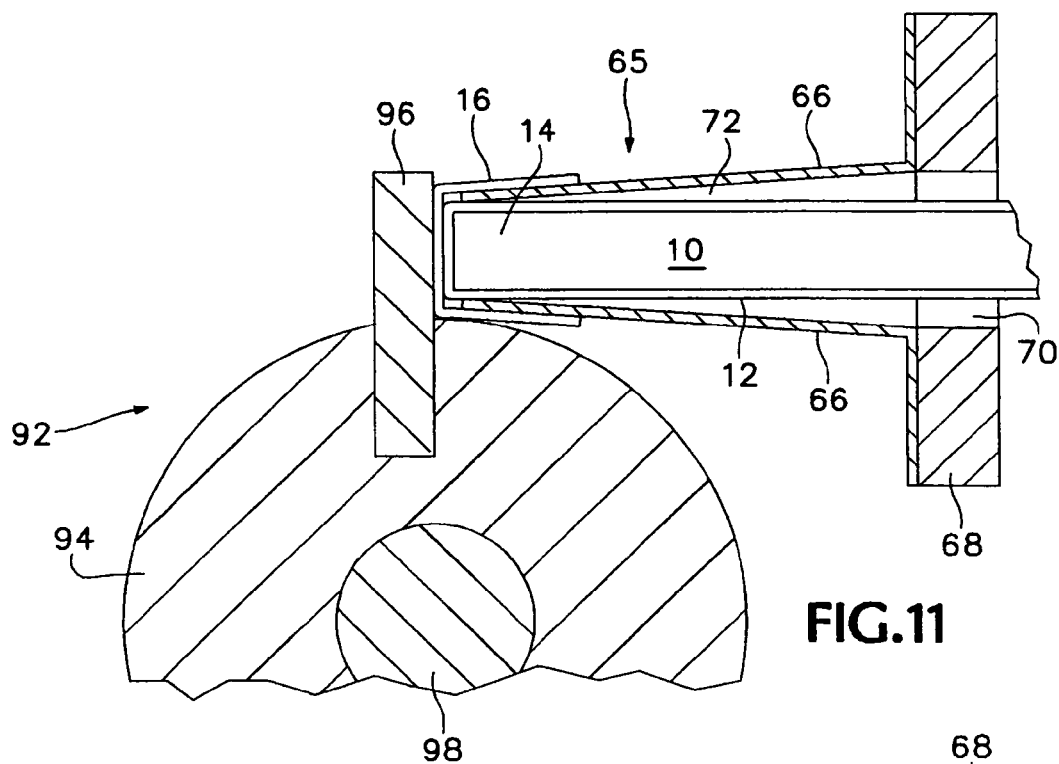
FIGS. 11 and 12 are cross-sectional views showing how the portion of the apparatus shown in FIG. 10 operates.
Figure 12:
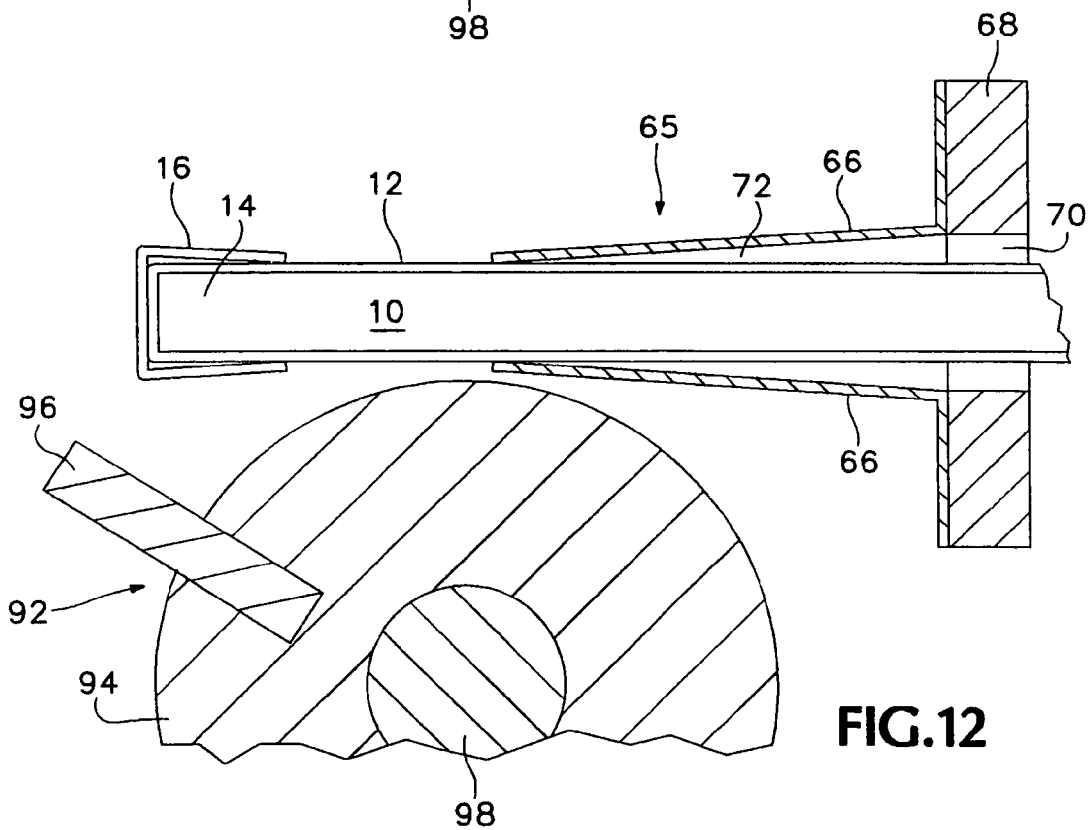

Also located in the assembly station is a support mechanism 92 which supports the edge piece while the edge 14 of the battery plate is inserted into it. Referring now also to FIGS. 10, 11 and 12, the support mechanism 92 includes a roller 94 which extends across the assembly station immediately below the edge piece. A stop 96 projects outwardly from the roller 94. The roller is rotatable on a shaft 98 between an engagement position, FIG. 11, where the stop 96 engages the bottom element of the edge piece and a release position, FIG. 12, where the stop is free of the edge piece. The shaft has a counterweight 99 at its extremity which is oriented to slowly bias the roller to its engagement position and to resist rotation away from the engagement position. Other means, such as frictional devices or a dashpot, could be used to provide this biasing and resistance.

In operation, as the strip 20 passes through the plow 30 and the bending rollers 38 it is bent into a U-shaped channel 48 having opposed sides 54 which are interconnected by a bottom element 46. As the channel leaves the bending rollers its sides are spread open by the spreader 60 and it is inserted into the assembly station 26 over the outlet end 72 of the funnel 65. When the end of the channel reaches the sensor 74 the sensor stops the motor that drives the bending rollers. The sensor also signals for the knife 76 to be actuated to cut the strip and form it into an individual edge piece 16. This edge piece is supported by the roller 94. Furthermore, the stop 96 engages the bottom of the edge piece and holds it in place.

When the edge piece 16 is cut from the channel 48 and is in place on the roller 94 a battery plate 10 is transported into the assembly station. The battery plate passes through the opening 70 in the funnel 65 and into the edge piece. Thus, the edge of the battery plate is easily inserted into the edge piece. The stop 96 and the resistance of the roller 94 against rotation holds the edge piece momentarily in place as the leading edge of the battery plate is inserted into it. Once the edge of the battery plate has been inserted into the edge piece the battery plate continues to move on the in-feed conveyer 86 and is transported onto the out-feed conveyer 88. The roller 94 rotates to its release position to allow the battery plate with the edge piece installed to move out of the apparatus. When the battery plate reaches a second sensor 100, located above the out-feed conveyor, the second sensor causes the motor that drives the bending rollers to restart and the process is repeated.

The battery plates are provided to the in-feed conveyor with the proper spacing to arrive at the assembly station at the appropriate time.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for applying an edge piece to the edge of a battery plate, comprising:
    (a) a feed mechanism which transports a thin strip of bendable plastic material;
    (b) a bending mechanism which forms said strip into an open top, U-shaped channel having opposed sides which are interconnected by a bottom element;
    (c) an assembly station which receives said channel;
    (d) a cutter which cuts off a portion of said channel which is inserted into said assembly station to form an edge piece;
    (e) a conveyor which transports a battery plate having an edge toward said edge piece such that said edge is inserted into said open top of said edge piece; and
    (f) a support mechanism which supports said edge piece while said edge of said battery plate is being inserted therein; and then releases said edge piece to travel out of said assembly station with said battery plate on said conveyor.

2. The apparatus of claim 1 further comprising a funnel located in said assembly station to facilitate the insertion of said edge into said edge piece.

3. The apparatus of claim 2 wherein said funnel has an inlet opening which is large enough to freely pass said battery plate and an outlet which fits into the open top of said edge piece.

4. The apparatus of claim 2 wherein said funnel comprises opposed thin plates.

5. The apparatus of claim 2 further comprising a spreader for spreading the sides of said channel as said channel is placed over said funnel.

6. The apparatus of claim 1 wherein said bending mechanism includes:
    (a) a plow which deflects opposed margins of said strip inwardly toward one another;

(b) a forming roller which fits between said opposed margins; and
(c) a pair of pinch rollers one of which engages each of said margins and presses it against said forming roller.

7. The apparatus of claim 6 wherein:
(a) said forming roller has engagement faces on each side thereof, said engagement faces being angled so as to bend said sides such that said sides angle inwardly toward one another as they extend away from said bottom element; and
(b) said pinch rollers have ends with an angle which is complimentary to the angle of said engagement faces.

8. The apparatus of claim 6 wherein said plow comprises:
(a) a U-shaped trough having tapered sides that have a minimum height at an inlet end thereof and a maximum height at an outlet end thereof; and
(b) a deflector which projects into said U-shaped trough.

9. he apparatus of claim 8 wherein said deflector has a width which is less than a width of said trough.

10. The apparatus of claim 9 wherein the width of said deflector is approximately two-thirds the width of said trough.

11. The apparatus of claim 8 wherein said deflector extends substantially to a bottom of said trough.

12. The apparatus of claim 1 wherein said support mechanism comprises:
(a) an elongate roller which is positioned below said assembly station;
(b) a stop projecting from said roller; and
(c) said roller being rotatable between an engagement position where said stop engages said edge piece of said edge piece and a release position where said stop is removed from said edge piece.

13. The apparatus of claim 12 further comprising a resistance device which resists the rotation of said roller between its engagement position and release position.

14. The apparatus of claim 13 wherein said resistance device is a counterweight.

15. The apparatus of claim 1 wherein the cutter is located at an inlet side of the assembly station.

16. The apparatus of claim 15 wherein the cutter includes a blade and a piston cylinder which moves the blade.

* * * * *